Nov. 18, 1924.
E. J. WIRFS
GASKET
Filed Jan. 8, 1923
1,516,130
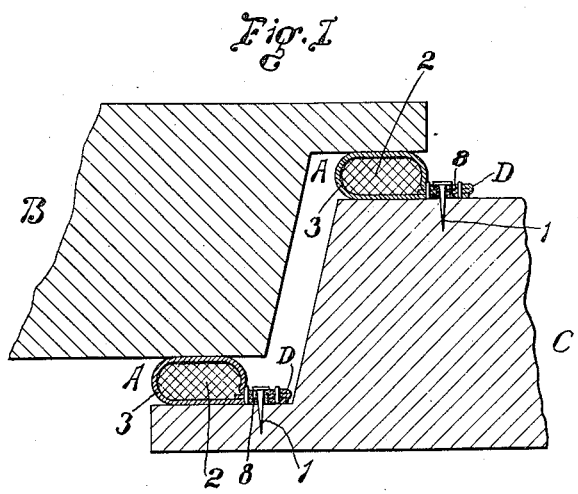
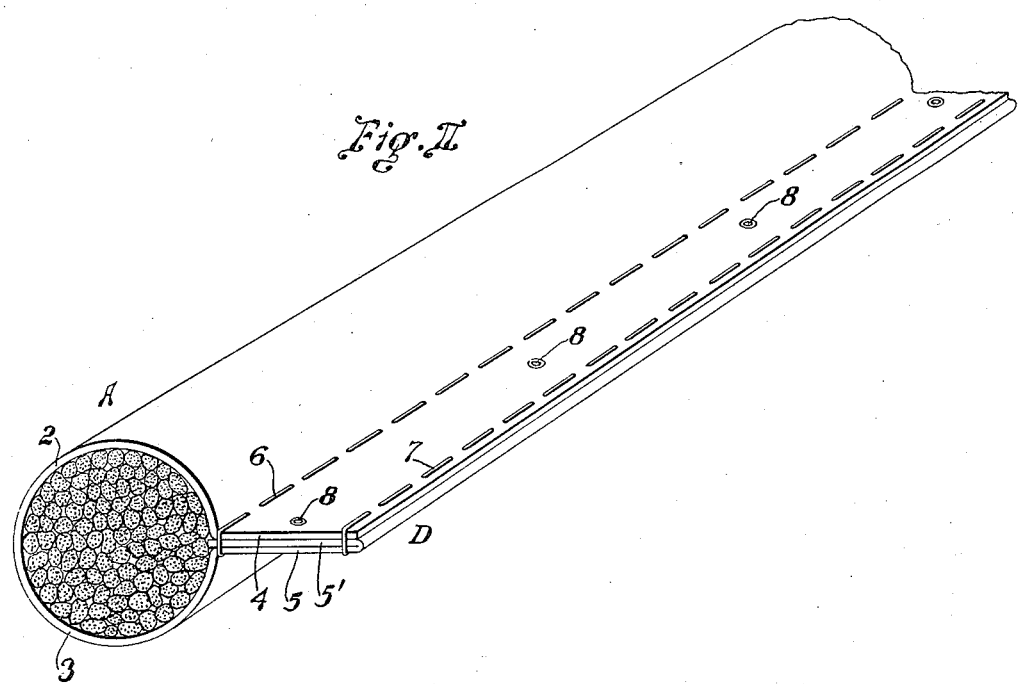
Inventor
E. J. WIRFS
By Cook & McCauley
Attorneys Patented Nov. 18, 1924.

1,516,130

UNITED STATES PATENT OFFICE.

EDWARD J. WIRFS, OF WEBSTER GROVES, MISSOURI.

GASKET.

Application filed January 3, 1923. Serial No. 611,512.

*To all whom it may concern:*

Be it known that I, EDWARD J. WIRFS, a citizen of the United States of America, a resident of Webster Groves, in the county of St. Louis and State of Missouri, have invented certain new and useful Improvements in Gaskets, of which the following is a full, clear, and exact description, reference being had to the accompanying drawings, forming a part of this specification.

This invention relates to improvements in gaskets adapted for use as packing around refrigerator doors, although it is to be understood that the new gasket could be used as a packing strip to form a seal between various other objects.

The main object of the invention is to produce a strong, simple and inexpensive flexible gasket having a neat appearance and provided with an enclosed packing element and a strong attaching flange extending from one side of the packing element.

Fig. I is a section showing two of the gaskets between a door and a wall of a refrigerator.

Fig. II is an enlarged perspective view showing an end portion of an elongated gasket embodying the features of this invention.

To illustrate one of the uses of the new gasket, I have shown a portion of a refrigerator equipped with gaskets A. A portion of a refrigerator door is shown at B, and C designates a portion of a refrigerator wall, the gaskets being between the door and wall. Each gasket is provided with a longitudinal attaching flange D adapted to receive tacks 1, or other suitable attaching devices, which may be inserted through the flange and driven into the object to which the gasket is applied.

The preferred form of the invention comprises an elongated body of yielding packing 2, which may be made of soft, fibrous cord, preferably asbestos. The body of packing is primarily circular in cross section, as shown in Fig. II, and it can be compressed or flattened as shown in Fig. I. This packing will freely yield to form an effective seal, and when the pressure is relieved it will tend to return to the substantially circular shape shown in Fig. II.

The gasket includes a strip of flexible, pliable material, preferably waterproof fabric, having a tubular middle portion 3 surrounding the elongated body of packing, a single ply marginal flange 4 extending from one side of the packing, and a marginal portion folded on itself to provide a two-ply flange comprising the outer flange element 5 and the interposed flange element 5' between the elements 4 and 5. In the preferred form of the invention, the interposed marginal flange element 5' is in contact with the inner faces of the flange elements 4 and 5, the single ply flange element 4 being entirely outside of the fold forming the two-ply flange 5—5'. By forming the flange elements in this manner, I produce a strong and relatively stiff three-ply attaching flange, and this particular combination and arrangement of elements enables me to very readily produce the desired flange with very little labor and at a low cost.

At the junction of the tubular portion 3 and the flange elements 4, 5 and 5', a row of stitches 6 is formed through the flange elements so as to unite said elements and at the same time securely confine the packing in the tubular portion. A row of stitches 7 is formed through the outer edges of the flange elements in a line adjacent to the fold uniting the elements 5 and 5'.

The several elements are thus combined with each other to closely confine the body of soft packing 2 which is protected by the enclosing middle portion 3 of a flexible, pliable strip, and the portions 4, 5 and 5' are united to form a strong attaching flange D adapted to receive the attaching devices 1. This flange is reinforced by the interposed marginal portion 5', and a neat, smooth edge is formed by the fold at the junction of members 5 and 5'. This fold preferably extends beyond the outer edge of the single ply 4.

When the device is manufactured, the flange D is approximately radial to the body of packing 2, but owing to the flexibility of the strip of fabric, a hinge-like connection is formed at the stitches 6, so when the flange D is attached to a flat surface, it can lie tangential to the body of packing, as suggested by Fig. I.

To receive the attaching tacks 1, a row of perforations is formed through the plies of the attaching flange D, said row being between and parallel with the rows of stitches 6 and 7. Metal eyelets 8 are preferably mounted in these perforations, said eyelets having the usual flanges whereby they are secured to the attaching flange D. The tacks, or the like, are merely inserted through the eyelets in the perforations and driven into the object on which the gasket is to be secured. By forming the row of perforations as herein shown, the tacks can be readily located in the most desirable positions between the rows of stitches, where they will effectively secure the gasket.

I claim:

1. A gasket comprising an elongated body of yielding packing, a strip of flexible, pliable material having a tubular enclosing portion surrounding said packing, said strip of material also having a single ply marginal flange extending from one of the edges of said tubular portion and a two-ply marginal flange extending from the other edge of said tubular portion, said single ply marginal flange and said two-ply marginal flange being arranged adjacent to each other to provide a comparatively stiff attaching flange, and a row of stitches at the junction of said marginal flanges and the edges of said tubular middle portion so as to confine the packing in said tubular portion.

2. A gasket comprising an elongated body of yielding packing, a strip of flexible, pliable material having a tubular enclosing portion surrounding said packing, said strip of material also having a single ply marginal flange extending from one of the edges of said tubular portion and a two-ply marginal flange extending from the other edge of said tubular portion, said single ply marginal flange and said two-ply marginal flange being of approximately the same widths and being arranged adjacent to each other to provide a comparatively stiff attaching flange, and a row of stitches at the junction of said marginal flanges and the edges of said tubular middle portion so as to confine the packing in said tubular portion.

3. A gasket comprising an elongated body of yielding packing, a strip of flexible, pliable material having a tubular enclosing portion surrounding said packing, said strip of material also having a single ply marginal flange extending from one of the edges of said tubular portion and a two-ply marginal flange extending from the other edge of said tubular portion, said single ply marginal flange and said two-ply marginal flange being arranged adjacent to each other to provide a comparatively stiff attaching flange, a row of stitches at the junction of said marginal flanges and the edges of said tubular middle portion so as to confine the packing in said tubular portion, said stitches being extended through all of the plies making up the attaching flange, and a second row of stitches passing through said marginal flanges at the outer edge thereof.

In testimony that I claim the foregoing I hereunto affix my signature.

EDWARD J. WIRFS.